Feb. 6, 1962    B. S. OLD ET AL    3,020,149
BENEFICIATION OF ORES
Filed April 8, 1959    2 Sheets-Sheet 1
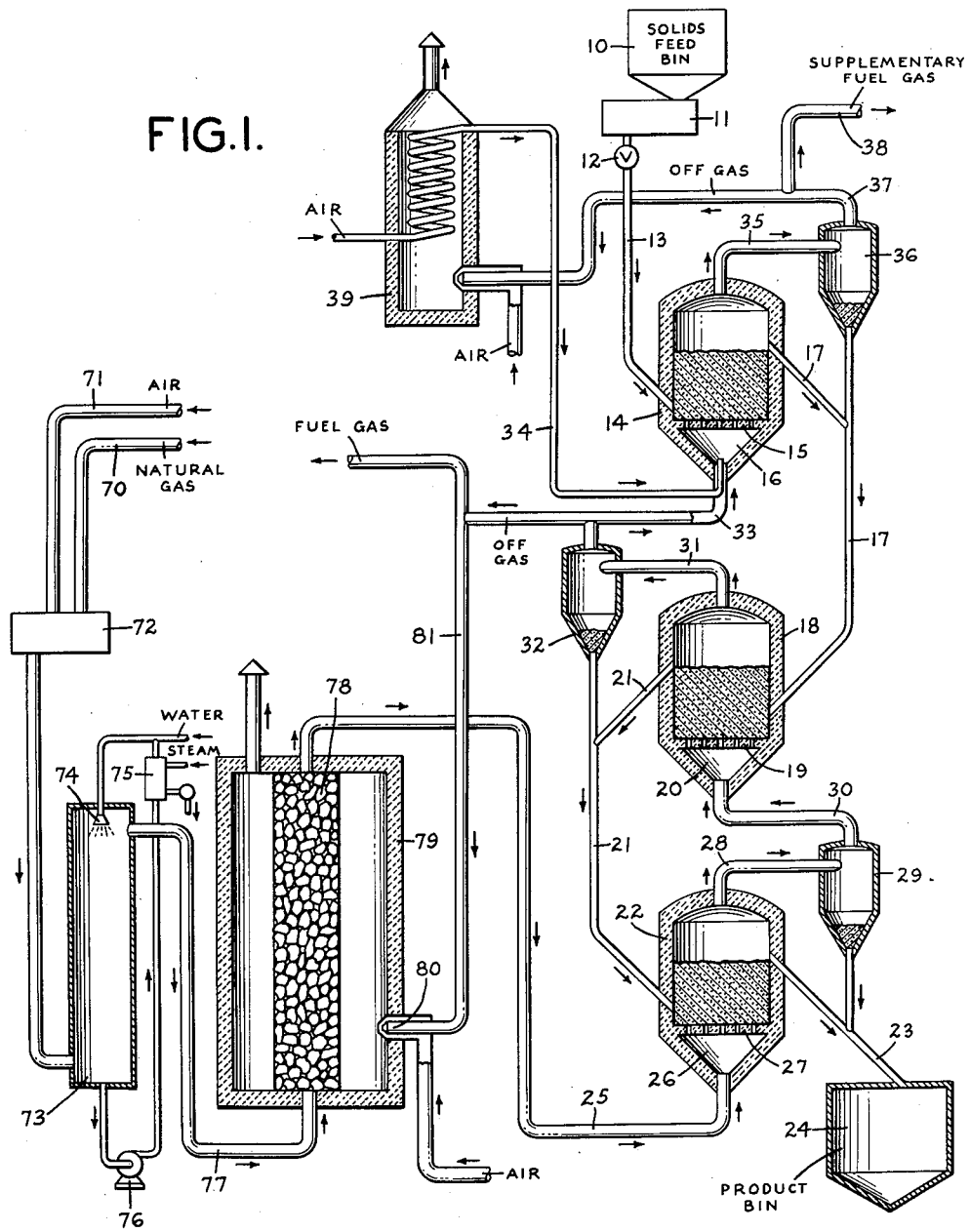
FIG.I.
INVENTORS
BRUCE S. OLD
RICHARD W. HYDE
HERMAN P. MEISSNER
STANLEY V. MARGOLIN
FRANK C. SCHORA, JR
BY
THEIR ATTORNEYS

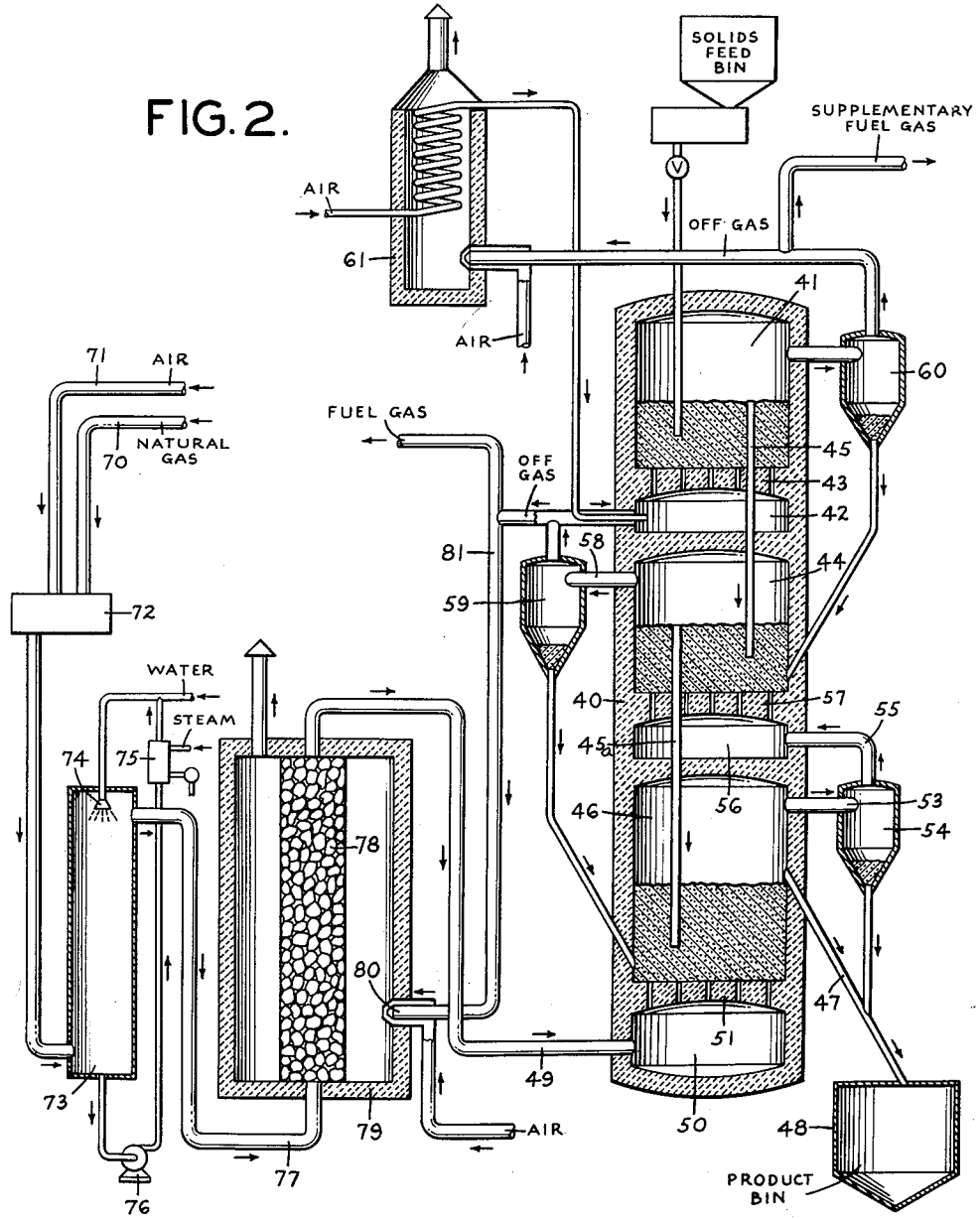

3,020,149
BENEFICIATION OF ORES
Bruce Scott Old, Concord, Richard Warren Hyde, Lexington, Herman P. Meissner, Winchester, Stanley V. Margolin, Newton, and Frank C. Schora, Jr., Bedford, Mass., assignors to Arthur D. Little, Inc., Cambridge, Mass., a corporation of Massachusetts
Filed Apr. 8, 1959, Ser. No. 805,070
5 Claims. (Cl. 75—26)

This invention relates to the beneficiation of inorganic compounds, such as metallic ores, and it relates more particularly to the reduction of iron ore in a fluid bed system by means of reducing gases.

In the reduction of iron ore, the most critical reaction is the conversion of ferrous oxide (FeO) to metallic iron. The reaction is favored by higher temperatures and high $H_2/H_2O$ and $CO/CO_2$ ratios. It is possible to carry out the reduction of FeO to Fe at relatively low temperatures and with recirculation of the gaseous reducing agents to obtain more efficient utilization thereof. Lower reducing temperatures require a reducing gas consisting essentially of hydrogen as the active reducing agent inasmuch as the efficiency of carbon monoxide as a reducing agent at temperatures below 600° C. to 700° C. is too low to seriously consider it as a reducing agent for the final conversion of ferrous oxide to iron. If the reducing gas consists principally of hydrogen with some nitrogen, the latter builds up in the system when the gas is recirculated to render its use economical which means that preforming of the reducing gas must be carried out using oxygen instead of air. Also, the recirculated gas must be cooled and scrubbed to remove water vapor and carbon monoxide (if carbonaceous gases are present) in order to rejuvenate the reducing gas. The rejuvenated gas must then be reheated by indirect means to attain the desired temperature levels for the reduction. All of these factors render low temperature reduction economically unfeasible. Even if the problems of gas composition and recirculation in low temperature reduction are disregarded, another major disadvantage in carrying out such low temperature reduction is that the resulting product is highly active or pyrophoric, thereby greatly increasing the difficulties encountered in handling and storing the product and in the subsequent steps of converting it to steel.

Reduction at higher temperatures where the kinetics of the reducing reaction are much more favorable is rendered complex because of the tendency of the reduced material to agglomerate and stick in the beds with the consequent loss of fluidization. Generally speaking, sticking or agglomeration of the particles is affected by the composition of the ore, the fluidizing gas velocity or degree of fluidization, the presence of indirect heat transfer creating points of excesively high temperature, distribution of gas throughout the bed and the size or the diameter of the fluidized bed unit.

As a general rule, we have found that the higher the iron content of the original ore, the greater the tendency of such ore towards sticking or agglomeration at a given temperature level. Lower grade ores can be reduced at higher temperature levels, for example, 1000° C. to 1100° C., whereas the high-grade ores must be reduced at lower temperature levels, for example, 800° C. to 900° C. to avoid agglomeration. The tendency towards sticking in the fluid bed also increases with the degree of reduction of a given ore. The maximum tendency towards sticking or agglomeration occurs in the vicinity of 20% to 40% metallization. Percentage metallization as used herein refers to the percentage of iron reduced to elemental iron (Fe) divided by the total iron present (Fe in the form of Fe and FeO).

Another factor in avoiding sticking at a given temperature level is the degree of fluidization or the fluidizing gas velocity in the reducing zone. With high fluidizing gas velocities, the material has a lesser tendency to stick at any given temperature level.

Points of excessively high temperature must be avoided in the reducing zones, inasmuch as they serve as a starting point for partial fusion and subsequent agglomeration or sticking of the material in the bed. For example, when the reducing apparatus or system is externally heated the heating should be uniform to avoid hot spots where sticking or agglomeration might start.

The distribution of the incoming reducing gas to the bed and the size of the bed units are also important factors in avoiding sticking of the reduced iron particles in the beds. We have found that the tendency towards sticking at a given temperature level decreases as the size of the diameter of the fluidizing unit employed increases. This effect arises from the violence of agitation within the large fluidizing units which tends to break up agglomerates that may form momentarily in the system. The introduction of gas must be such that agitation is created. Moreover, less sticking occurs at a given temperature and gas velocity with gases having higher densities. When substantially pure hydrogen is used, better results are obtained when the system is operated at high gas pressure, for example 5 atmospheres.

Another problem in the fluid bed reduction of iron ores is to provide conditions suitable for treating economically ores having a wide range of particle sizes. The treatment of ores containing substantial proportions of finely divided material has always been inefficient because of the loss of fines in the off-gases, and the non-uniformity of reduction going on in the reducing zone. The finely divided ores are reduced to metal in a small fraction of the time required to reduce the larger ore particles. These fines, presumably because of a higher degree of metallization, tend to promote sticking or agglomeration especially in batch operations and at the low fluid velocities which must be used to prevent blowing off and loss of the finely divided particles as dust. Thus, it has been necessary to classify the ores and to treat separately ores of different particle sizes in order to reduce and handle them uniformly. Even under these circumstances, the fines cause considerable difficulty and are not readily treated in batch fluid bed operations.

Based on the preceding observations, and in accordance with the present invention, we have provided a process and a system for beneficiating metallic ores, and particularly for reducing iron ores, in which the reducing actions take place under conditions which avoid agglomerating or sticking of the ore, make efficient use of the reducing gases and produce a non-pyrophoric and substantially uniformly reduced product.

More particularly, in accordance with the invention, the ore is reduced in a continuous flow, multiple stage, fluidized bed system in which the solids pass through the several stages countercurrent to the flow of the hot reducing gases while maintaining temperature and reducing conditions in the beds such as to promote the reducing actions therein at temperature levels which avoid agglomeration or sticking of the particles. By utilizing at least three fluid bed stages in a continuous system, the raw heated reducing gas which enters the final reducing stage and fluidizes the material therein is in contact with reduced ore having an average metallization very substantially greater than 40% and thereby is less susceptible to sticking and agglomeration. The partially spent and somewhat cooled reducing gas from the final reducing stage flows to an intermediate stage where it is in contact largely with partially reduced oxides discharged from a preheating and prereducing zone. The material leaving the prereducing zone is subjected to strong reducing conditions which carry the reduction quickly to above 40% metallization. Due to the lower temperature of the reducing gas and the velocity thereof through the intermediate bed, and the high average percent of metallization, unwanted agglomeration and sticking are avoided. Part of the gas from the intermediate reducing stage is burned to heat other gas passing through a preheating and pretreating stage whereby the temperature of the gases therein is raised to a sufficiently high level to preheat the ore and at the same time reduce the more highly oxidized ore substantially completely to ferrous oxide. In this way, by appropriate control of the temperature and the reducing capacity of the gases in the various stages, it is possible to make highly efficient use of the reducing gases and produce a product which is 80 to 90% metallized.

Another feature of the present invention is the provision of means whereby fines which are carried over by the reducing gases discharging from each reducing stage are separated and are supplied to a more advanced stage of the reducing system. Thus, the fines discharged from the preheating and prereduction stage are separated from the gases and are introduced into an intermediate stage. Likewise, the fines carried by the gas from the intermediate stage are introduced into the final reducing stage. In this way none of the stages becomes static. By removing and advancing the fines more rapidly through the reducing cycle, they are not reduced to a substantially greater extent than the larger particles which have greater volume and less surface area in proportion and thus require longer periods of residence in the reducing stage for complete reduction thereof.

Systems and methods of the type generally described above provide an ideal approach to a large scale direct reduction of iron ore for the reason that they operate on the basis of a single pass system, that is, the reducing gas mixture passes through the reducing stages without recirculation. The off-gas or top gas leaving the system can be employed for preheating the reactants and for the generation of power and steam.

A single pass system enables operation under conditions where utilization of the reducing agents will be as high as possible. It enables the reducing reactions to be carried out at maximum permissible operating temperatures to attain the necessary reaction rates and it utilizes fully the thermal energy contained in the off-gases from the reduction in a useful way to minimize consumption of fuel.

For a better understanding of the present invention, reference may be had to the accompanying drawing, in which:

FIGURE 1 is a schematic illustration of a typical system for practicing the present invention; and FIGURE 2 is a schematic illustration of a modified system for practicing the invention.

Important factors for the operation of a system of the type embodying the present invention are the maintenance of an adequate degree of fluidization and the minimization of excessive temperature at any point in the fluidized bed system. The latter consideration means that the reducing gas entering the system must be hot, but its temperature differential above that of the operating temperature of the bottom bed must be kept relatively small. The incoming reducing gas must be introduced at a temperature sufficient to supply the necessary heat to support the endothermic reduction reaction and maintain the fluidized reducing zone at a desired operating temperature level, generally in the range of 700 to 1000° C., depending upon the original ore utilized. For this reason, the reducing gas mixture must be preheated prior to entering the fluidized bed system and the ore must also be preheated before final reduction of the ferrous oxide to iron.

As indicated above, the reduction of ferrous oxide (FeO) to iron is the critical and controlling reaction in the process. This conversion constitutes the final reduction step. We have found that at least two fluidized bed stages are required to accomplish the final reduction step and obtain good gas efficiency and a high degree of reduction of the iron to 80%–90% metallization or higher. The systems disclosed in FIGURES 1 and 2 of the drawings are suitable for multiple stage fluidized reduction of iron ore and the like.

As shown in FIGURE 1 of the drawings, one system includes a bin 10 from which ore is discharged into a feeder 11 and through a metering valve 12 and a conduit 13 into the bottom of a preheating and prereduction reaction chamber 14. The reaction chamber has a porous floor or hearth 15 through which reducing gas is introduced from a combustion chamber 16 below the floor 15 to fluidize, heat and partially reduce the ore in the chamber 14. The partially reduced ore in the chamber 14 is discharged through an overflow pipe or downcomer 17 into another reaction chamber 18 at a point adjacent to the porous floor or hearth 19 thereof. A chamber 20 below the porous floor 19 serves to admit reducing gas into the chamber 18 to fluidize the bed of partially reduced ore thereon. The material in the chamber 18 overflows through an overflow conduit 21 into the final reduction chamber 22 and from the chamber 22 is discharged by means of an overflow conduit 23 into a storage bin 24. Reducing gas generated in a manner to be described hereinafter is introduced into the lowermost reducing chamber 22 through a conduit 25 which discharges into a chamber 26 beneath a porous floor or hearth 27 in the chamber 22 and flows upwardly through the bed of partially reduced ore thereon, fluidizing it and maintaining it in a constant state of agitation. The gases from the chamber 22 are discharged through a pipe into a cyclone separator 29 or the like where the fines are separated and are discharged downwardly into the conduit 23 for delivery into the bin 24. The clean gases from the separator 29 flow through the conduit 30 into the chamber 20 and upwardly through the porous hearth 19 into the bed of ore in the reaction chamber 18, agitating and fluidizing the ore therein. Partially spent gases are discharged from the chamber 18 through the pipe 31 into a cyclone separator 32 where the fines carried by the gases are discharged into the conduit 21 and part of the spent gas is discharged through a conduit 33 into the chamber 16. A portion of the spent gas is burned in the chamber 16 with heated air supplied through a conduit 34 to raise the temperature of the gases flowing through the porous bottom 15 of the chamber to fluidize, agitate, preheat and partially reduce the ore therein. The off-gas from the chamber 14 is discharged through the pipe 35 into a cyclone separator 36 where the fines are separated and discharged into the conduit 17 for introduction near the bottom of the bed in the chamber 18. Waste gases from the separator 36 are discharged through the conduits 37 and 38 for burning, for example, in the chamber 39 to heat air introduced through the pipe 34 and for operating other equipment or for the generation of heat or steam as may be desired. The system described above enables the temperature in the system to be controlled closely and it minimizes the heat requirements in the final reduction stage in the chamber 22 so as to reduce the tendency of the partially reduced ore to stick and agglomerate. Thus, preheating and reduction of hematite and magnetite to ferrous oxide can be accomplished simultaneously in the fluid bed operation in the chamber 14 by taking a part of the gas from the reaction chamber 18 and burning it to increase the temperature level of the gas and put it in a more favorable condition for reducing the ore to ferrous oxide.

Reduction of hematite to magnetite is extremely fast and the reduction of magnetite to ferrous oxide is significantly faster and easier than the final conversion of ferrous oxide to iron. Moreover, it can be carried out at higher temperatures and with less highly reducing gases than the final conversion to FeO. Inasmuch as the intermediate reaction chamber 18 is at a lower temperature than either the preheating stage in chamber 14 or the final stage in chamber 22, agglomeration or sticking of the partially reduced ore is avoided in chamber 18, even though the partially reduced ore passes through the state most susceptible to agglomeration or sticking. In other words, an almost automatic control of temperature is obtained by utilizing a plurality of reducing stages in the treatment of the ore.

It is desirable to use relatively high gas velocities in the various reducing stages to avoid sticking and loss of fluidization. We have found that optimum results are obtained when the velocities of the gas are maintained at substantial levels, that is, between about 1½ and 5 feet per second depending on the particle size distribution of the ore. An ideal relationship of particle size to gas velocity is such that the fine fraction carried over by the gases to the separator attains substantially the same degree of reduction as the coarse fraction discharged by overflow directly from the fluidized bed in the reducing chamber. For example, with an ore ranging from ¼ or ⅛ inch particle size down to 325 mesh and finer, a fluidizing velocity of about three feet per second will carry the 100 to 200 mesh and finer material over into the separators, essentially in equilibrium with the overflow fraction of the corresponding chamber. This effect is due to the fact that the fines with the higher surface area to weight ratio are reduced more rapidly than the coarse particles having a surface area to weight ratio of much smaller degree. The use of gas velocities on the order of those mentioned also has the beneficial effect of promoting substantial agitation in the fluidized bed which breaks apart any particles tending to stick together. This action can be enhanced by utilizing reduction chambers having fluid beds of substantial horizontal extent as well as considerable depth. For example, in the form of the invention illustrated in FIGURE 1, a fluid bed depth between 6 and 12 feet and reaction chambers of about the same diameter are effective in avoiding sticking of the particles.

The extent of fines carryover with the gas from each of the reaction chambers 22, 18 and 14 is a function of the reducing gas velocity through each bed. The gas velocity and efficiency of reduction can be related to and regulated by adjustment of the total pressure in the system. By operating the system under pressure, the velocity of the gas can be adjusted to control the fines carryover, while maintaining a sufficient quantity of reducing gas in the system to assure capacity operation.

Operation at elevated pressure serves to increase the capacity of a given reducing unit by virtue of the increased number of mols of reducing gas that can be put through a system but the velocity of a gas must be controlled depending on the size distribution of the fines material in order to operate the process in such a way that the fines fraction is reduced to the same extent as the coarse fraction and carried through the process with the coarse fraction, thereby avoiding a buildup of the fines at any particular zone or point in the process. As indicated above, a gas velocity of about a foot and a half per second to about five feet per second is satisfactory. The gas pressure in the system may be as much as about 5 atmospheres gauge.

In the system illustrated in FIGURE 1, the coarse fraction and the fine fraction are transferred by means of external pipes or downcomers through which the materials flow by gravity into the next lower reduction stage. The discharge pipe can be arranged to extend into the lower bed whereby the proportion of gas passing down through the discharge leg is reduced. If desired, suitably cooled screw feeders can be mounted in the downcomers. The feeders serve as a partial seal against the flow of gas through the downcomers of the system. If desired, the fine material from the separator can be introduced into the downwardly flowing coarser material in the discharge downcomer by means of gas induction. However, the arrangement illustrated in FIGURE 1 of the drawings serves admirably so long as a sufficient bed of fluidized fines is maintained in the discharge pipe from the separator.

There is an advantage in allowing the fines to cool in the discharge from the separators 36, 32 and 29 by about 100° C. The lower temperature avoids all possibility of sticking or agglomerating when the fines are brought into contact with the reducing gases in the next lower stages.

The system disclosed in FIGURE 2 is essentially the same as that disclosed in FIGURE 1 except that the three reduction chambers are joined in a single column with internal downcomers for discharging material from one bed to another. The reducing system comprises a cylindrical column 40 having a preheating and prereduction chamber 41 at its top separated from a gas inlet and combustion chamber 42 by means of a porous hearth or floor 43 through which the combustion products and gases flow into the chamber 41. Below the combustion chamber 42 is an intermediate stage reduction chamber 44 which is supplied the partially reduced overflow material from the chamber 41 through a downcomer pipe 45. Overflow from the bed of material in the chamber 44 passes through the downcomer pipe 45a into the final stage reducing chamber 46 from which the material is discharged by means of an overflow pipe 47 to storage 48. As in the system shown in FIGURE 1, reducing gas is introduced through a conduit 49 into a chamber 50 below the final reducing chamber 46 and through the perforated bottom 51 thereof for fluidizing the material supported by the bottom. Gas is discharged through the conduit 53 into the separator 54 and the clean gas flows from the separator through the pipe 55 to the chamber 56 beneath the reaction chamber 44. A porous floor 57 in the reaction chamber 44 admits the gas from the chamber 56 into the chamber 44 thereby fluidizing the material therein. Discharge gas from the chamber 44 flows through the pipe 58 into the separator 59 and into the precombustion chamber 42. Gas issuing from the preheating and prereduction chamber 41 flows through the separator 60 where the fines are removed and the gas may be used in the air preheater 61 for heating the air introduced into the combustion chamber 42 for partially burning the reducing gas therein. The fines separated by the separator 60 are discharged into the bed in the intermediate reduction chamber 44 below the level thereof; the fines separated by the separator 59 are discharged near the bottom of the bed in the chamber 46 and the fines separated by the separator 54 are discharged into the product bin.

From the description thus far, it will be apparent that the heated raw or fresh reducing gases first come into contact with the most highly reduced or highly metallized portion of the ore in the last reducing stage of the system, that is, in either the chamber 22 or the chamber 46. In this stage, the iron ore is over 40% metallized, in most cases 55% or higher, and thus is not as susceptible to sticking and agglomeration. In this way the final reduction stage can be operated with fresh gases and at temperatures on the order of 700° or higher without danger of the material sticking and agglomerating. Due to the exothermic nature of the reaction, the temperature of the gases entering the reaction chamber 18 or 44 is substantially reduced so that a lower temperature is maintained in the zone where the condition of the partially reduced ore is such as to render it most susceptible to sticking and agglomeration. In other words, the ore entering the second or intermediate stage of reduction is in about the 20% to 40% metallized state and must be reduced quickly to above 40% metallization at a lower temperature which is obtained almost automatically by the present system. In the preheating and prereducing stage, maximum temperature differential is desirable and high reducing temperatures are required in order to promote substantially complete reduction of the higher iron oxide to ferrous oxide. This is accomplished of course by providing additional heat by the combustion of a part of the reducing gases in the combustion chamber 16 of the system of FIGURE 1 or the combustion chamber 42 of the system disclosed in FIGURE 2.

In a typical operation, a hematite ore containing particles ranging from about ¼ inch in diameter to about 325 mesh and smaller is supplied to the preheating and prereducing chamber 14. A reducing gas is introduced into the final stage reducing chamber 22 for flow through the final, intermediate and pretreating stages countercurrent to the flow of ore and reduced ore therethrough at a velocity of about 3 feet per second calculated on the basis of an empty chamber and the temperature pressure conditions existing.

The following table discloses the composition of a typical fresh reducing gas and the variation in the composition and volume of the gas at the various reducing stages:

Table 1

| Gas Stream in Process | Volume, s.c.f.h.[1] | CO, percent by Volume | $CO_2$, percent by Volume | $H_2$, percent by Volume | $H_2O$, percent by Volume | $CH_4$, percent by Volume | $N_2$, percent by Volume |
| --- | --- | --- | --- | --- | --- | --- | --- |
| Fresh reducing gas to 2d stage reducer (22) | 59,000 | 21.0 | 0.4 | 49.1 | 1.7 | 0.3 | 27.5 |
| Gas to 1st stage reducer (18) | 59,000 | 16.9 | 4.5 | 40.4 | 10.4 | 0.3 | 27.5 |
| Gas from 1st stage reducer (18) | 59,000 | 13.7 | 7.7 | 34.3 | 16.5 | 0.3 | 27.5 |
| Gas to ore preheater-reducer (14) | 36,000 | 13.7 | 7.7 | 34.3 | 16.5 | 0.3 | 27.5 |
| Fuel gas from 1st stage reducer (18) | 23,000 | 13.7 | 7.7 | 34.3 | 16.5 | 0.3 | 27.5 |
| Gas from ore preheater-reducer (14) | 42,000 | 7.5 | 11.0 | 9.9 | 37.2 | 0.2 | 34.2 |

[1] Cubic feet per hour at standard conditions per ton of reduced iron product.

It will be understood, of course, that reducing gases having other compositions may be used in the process.

The product obtained was about 90% metallized.

A gas of the kind described above is produced by the catalytic reformation of hydrocarbons such as, for example, natural gas or methane with air and steam. As illustrated in FIGURE 1, natural gas and air are introduced through the condits 70 and 71 into a mixing chamber 72. The mixed gases under pressure pass from the mixing chamber 72 into a humidifying chamber 73 where water is introduced through a spray head 74 from a suitable water source. The humidity of the gases is controlled by means of a heat exchanger 75 which reheats the recycled water supplied by the pump 76 from the bottom of the humidifying chamber 73. The humidified gases then flow through a conduit 77 into a catalyst chamber 78 which is mounted in a refractory combustion chamber 79. The catalyst chamber is packed with a suitable catalyst such as, for example, a nickel catalyst or an alumina-supported nickel catalyst where the gases are reformed. In order to promote reformation of the gases, the combustion chamber 79 is heated by burning part of the gases issuing from the separator 32 and supplied to the gas burner 80 by means of the pipe 81. By appropriate control of the temperature in the combustion chamber 79, the reformed gases issue from the catalyst chamber 78 at a temperature between about 750° and 1200° C. A typical gas leaving the catalyst chamber contains approximately 21% CO, 0.4% $CO_2$, 49.1% hydrogen and 1.7% water, the balance being essentially nitrogen. To produce a gas of this composition, the amount of air supplied to the mixing chamber 72 should provide about ½ mol of contained oxygen per mol of methane. About 11,000 to 15,000 cubic feet of methane is adequate per ton of iron depending upon the degree of reduction required and the number of countercurrent stages employed.

This process of producing reducing gas has the further advantage that any of the hydrocarbon which has not been converted to CO and $H_2$ is converted in the bottom of the reaction chamber 22. Conditions therein are ideal for final reformation of the hydrocarbon in that mixing is almost infinite and the remaining hydrocarbon comes into contact with finely divided metallic iron which catalyzes the hydrocarbon and aids in its decomposition. With this high degree of mixing and in the presence of ferrous oxide, carbon deposition is largely prevented unless the bed consists essentially of metallic iron approaching 100% metallization. While some carbon undoubtedly is produced during the reformation of the residual hydrocarbon, it appears that the active carbon which is formed under the conditions prevailing in the reduction zone disappears as rapidly as it is formed by the reaction with carbon dioxide, water in the feed gas and by reduction of ferrous oxides.

The new system and method are largely self-regulating in the use of the reducing gases. Thus, if the reducing gases are inefficiently used in the reducing chambers 22 and 18, a richer gas of higher calorific value will be delivered to the burner in the combustion chamber 79. This will result in a higher operating temperature in the catalyst chamber 78 which in turn permits a higher degree of humidification in the chamber 73 and therefore a higher percentage of hydrogen in the gases supplied to the last stage reduction chamber 22. Inasmuch as hydrogen is a more active reducing agent than carbon monoxide, the gas will increase the rates of reduction in the chambers 22 and 18, resulting in a leaner off-gas, thereby automatically correcting the system to give maximum thermal efficiency, that is, minimum fuel consumption per ton of iron.

The above-described method and system for generating reducing gases is highly efficient and is most suitable for use in conjunction with the new reducing system. Nevertheless other methods may be used for the generation of reducing gas mixtures for this process, such as straight thermal reforming of natural gas and other gaseous fuels with air or oxygen, catalytic oxygen-steam reforming of natural gas or other hydrocarbons, as well as oxygen-steam reforming of heavy oils or solid fuels. It will be further understood that the conditions under which reduction of the ore takes place may be varied depending upon the kind of ore undergoing treatment and that variations in the temperatures and gas velocities in the system may be made in order to assure fluidization of ore particles of various sizes and to compensate for a tendency of the ore to stick depending upon its degree of metallization. Thus, it is possible to operate at higher temperatures in each of the stages if the gas velocities are proportionately increased to maintain fluidization through agitation and separation of the particles therein. Moreover, more efficient reduction may be obtained by operating at higher gas pressures with appropriate variation of the velocity to maintain proper operating conditions. Therefore, the invention as described herein is susceptible to wide modification and the examples of the system and method set

We claim:

1. A process for reducing metallic oxides comprising passing finely-divided particles of a metallic oxide through a preheating and prereducing zone, a first reaction zone and a second reaction zone, flowing hot raw reducing gas heated to a temperature of between about 750° C. and 1200° C. into said second reaction zone from below to fluidize the particles therein, reduce them and entrain the smaller particles, discharging the partially spent and partially cooled reducing gas from said second reaction zone, separating from said gas said smaller particles entrained therein, introducing said gas into said first reaction zone from below to fluidize the particles therein, reduce them at a temperature below that at which sticking occurs and entrain the smaller particles, discharging the more completely spent gas from said first reaction zone, separating said smaller particles from said gas, introducing the separated smaller particles into the fluidized particles in said second reaction zone, burning a part of the gas discharged from the first reaction zone to heat the gas and introducing it from below into the particles in said preheating and prereducing zone to fluidize the particles therein and partially reduce them, discharging the gas from the preheating and prereducing zone, separating any finely-divided particles entrained therein and introducing the separated particles into said first reaction zone.

2. The process set forth in claim 1 in which the gas is introduced into said reaction zones and said preheating and reducing zones at a velocity of between about one and one-half feet and five feet per second.

3. The process set forth in claim 1 in which the temperature of the gas introduced into the first reaction zone is not substantially in excess of 900° C.

4. The process set forth in claim 1 in which the temperature of the gas introduced into the first reaction zone is between about 750° C. and 900° C. and the temperature of the heated gas introduced into the preheating and prereducing zone is between about 1000° C. and 1150° C.

5. The process set forth in claim 1 in which the reducing gas is synthesis gas.

References Cited in the file of this patent

UNITED STATES PATENTS

| | | |
|---|---|---|
| 2,481,217 | Hemminger | Sept. 6, 1947 |
| 2,750,276 | Marshall | June 12, 1956 |
| 2,864,688 | Reed | Dec. 16, 1958 |
| 2,891,846 | Knight | June 23, 1959 |
| 2,894,831 | Old et al. | July 14, 1959 |